United States Patent
Aas et al.

(10) Patent No.: US 10,346,722 B2
(45) Date of Patent: *Jul. 9, 2019

(54) SIGNAL CLASSIFICATION USING SPARSE REPRESENTATION

(71) Applicant: International Business Machines Corporation, Armonk, NY (US)

(72) Inventors: Cecilia J. Aas, Saffron Walden (GB); Raymond S. Glover, Saffron (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,300

(22) Filed: Sep. 19, 2018

(65) Prior Publication Data

US 2019/0019065 A1 Jan. 17, 2019

Related U.S. Application Data

(63) Continuation of application No. 15/834,774, filed on Dec. 7, 2017, which is a continuation of application
(Continued)

(51) Int. Cl.
*G06K 9/62* (2006.01)
*G06K 9/46* (2006.01)

(52) U.S. Cl.
CPC ......... *G06K 9/6257* (2013.01); *G06K 9/4604* (2013.01); *G06K 9/627* (2013.01);
(Continued)

(58) Field of Classification Search
None
See application file for complete search history.

(56) References Cited

U.S. PATENT DOCUMENTS 8,331,632 B1 12/2012 Mohanty et al.
8,498,454 B2 7/2013 Tu et al.
(Continued)

FOREIGN PATENT DOCUMENTS

CN 103984922 A 8/2014

OTHER PUBLICATIONS

Wikipedia, "Compressed Sensing," https://en.wikipedia.org/wiki/Compressed_sensing, downloaded on Nov. 16, 2016, pp. 1-12.
Zhang et al., "Pose-Robust Face Recognition Via Sparse Representation," ACM Digital Library, vol. 46, Issue 5, May 2013, http://dl.acm.org/citation.cfm?id=2430754.2431001&coll=DL&dl=GUIDE, downloaded on Aug. 31, 2016, Absract Only, pp. 1-2.
Wikipedia, "Receiver Operating Characteristic," https://en.eikipedia.org/wiki/Reciever_operating_characteristic, downloaded on Nov. 16, 2016, pp. 1-7.
(Continued)

*Primary Examiner* — Bernard Krasnic
(74) *Attorney, Agent, or Firm* — Brian J. Colandreo, Esq.; Jeffrey T. Placker, Esq.; Holland & Knight LLP

(57) ABSTRACT

A system, method and computer program product is provided. An input signal for classification and a set of pre-classified signals are received, each comprising a vector representation of an object having a plurality of vector elements. A sparse vector comprising a plurality of sparse vector coefficients is determined. Each sparse vector coefficient corresponds to a signal in the set of pre-classified signals and represents the likelihood of a match between the object represented in the input signal and the object represented in the corresponding signal. A largest sparse vector coefficient is compared with a predetermined threshold. If the largest sparse vector coefficient is less than the predetermined threshold, the corresponding signal is removed from the set of pre-classified signals. The determining and comparing are repeated using the input signal and the reduced set of pre-classified signals.

2 Claims, 3 Drawing Sheets

Related U.S. Application Data

No. 15/374,030, filed on Dec. 9, 2016, now Pat. No. 10,121,094.

(52) U.S. Cl.
CPC ......... *G06K 9/6249* (2013.01); *G06K 9/6277* (2013.01); *G06K 2009/4695* (2013.01)

(56) References Cited

U.S. PATENT DOCUMENTS

| | | | |
|---|---|---|---|
| 10,121,094 B2 * | 11/2018 | Aas | G06K 9/6249 |
| 10,127,476 B2 * | 11/2018 | Aas | G06K 9/6249 |
| 2011/0064302 A1 | 3/2011 | Ma | |
| 2013/0129159 A1 | 5/2013 | Huijgens et al. | |
| 2017/0316340 A1 * | 11/2017 | Kafai | G06N 99/005 |
| 2017/0364740 A1 | 12/2017 | Aas | |

OTHER PUBLICATIONS

Wright et al., "Sparse Representation for Computer Vision and Pattern Recognition," Proceedings of IEEE, Mar. 2009, pp. 1-10.
Yang et al., "Towards a Robust Face Recognition System Using Compressive Sensing," Conference Paper, Interspeech 2010, 11th Annual Conference of the International Speech Communication Association, Makuhari, Chiba, Japan, Sep. 26-30, 2010, https://www.researchgate.net/publication/221490221_towards_a_robust . . . , downloaded on Aug. 31, 2016, pp. 1-3.
Wright et al., "Robust Face Recognition Via Sparse Representation," IEEE Transactions on Pattern Analysis and Machine Intelligence, vol. 31, No. 2, Feb. 2009, pp. 1-18.
Computational Vision: Archive, http:///www.vision.caltech.edu/html-files/archive.html, Nov. 2, 2016, downloaded Dec. 8, 2016, pp. 1-3.

\* cited by examiner

SIGNAL CLASSIFICATION USING SPARSE REPRESENTATION

RELATED APPLICATIONS

The subject application is a continuation application of U.S. patent application Ser. No. 15/834,774, filed Dec. 7, 2017, which is a continuation application of U.S. patent application Ser. No. 15/374,030, filed Dec. 9, 2016, the entire contents of which are incorporated herein by reference.

BACKGROUND

The present disclosure relates to signal processing and classification using sparse representation and more particularly, although not exclusively, to the classification of a signal representing an image of an unknown subject against a set of pre-classified signals, each representing an image of a known subject, using sparse representation.

SUMMARY

According to an aspect of the present disclosure, a method is provided. The method may receive an input signal for classification and a set of pre-classified signals. The input signal and each signal in the set of pre-classified signals may include a vector representation of an object having a plurality of vector elements. The method may further include determining a sparse vector comprising a plurality of sparse vector coefficients. Each sparse vector coefficient corresponds to a signal in the set of pre-classified signals and represents the likelihood of a match between the object represented in the input signal and the object represented in the corresponding signal of the set of pre-classified signals. The method may further include comparing a largest sparse vector coefficient of the determined sparse vector with a predetermined threshold. If the largest sparse vector coefficient is less than the predetermined threshold, the method may further include removing the signal of the set of pre-classified signals corresponding to the largest sparse vector coefficient from the set of pre-classified signals to produce a reduced set of pre-classified signals, and repeating the determining and comparing using the input signal and the reduced set of pre-classified signals.

According to another aspect of the present disclosure, a method is provided. The method may receive a plurality of input signals for classification and a set of pre-classified signals. Each of the plurality of input signals and each signal in the set of pre-classified signals may include a vector representation of an object having a plurality of vector elements, and wherein the classification of each of the plurality of input signals is known. For each input signal, the method may determine a sparse vector comprising a plurality of sparse vector coefficients. Each sparse vector coefficient corresponds to a signal in the set of pre-classified signals and represents the likelihood of a match between the object represented in the input signal and the object represented in the corresponding signal of the set of pre-classified signals. For each input signal, the method may further determine whether the object represented in the pre-classified signal corresponding to a largest sparse vector coefficient of the determined sparse vector matches the object represented in the input signal. For each input signal, the method may further store the value of largest sparse vector coefficient in memory. The value of largest spare vector coefficient may be stored in a first group of training data, if the object represented in the pre-classified signal corresponding thereto matches the object represented in the input signal, and in a second group of training data, if the object represented in the pre-classified signal corresponding thereto does not match the object represented in the input signal. The method may determine a threshold value for the largest sparse vector coefficient based on the values stored in the first and second groups of training data in memory. The threshold value represents a minimum value for the largest sparse vector coefficient indicative of a true positive match.

According to further aspects of the present disclosure, a computer product is provided. The computer program product comprises a computer readable storage medium having program instructions embodied therewith. The program instructions are executable by a processor to cause the processor to perform a method according to one or more of the above aspects of the present disclosure.

According to another aspect of the present disclosure, a system is provided. The system comprises a processor for classifying an input signal, and memory for storing data. The processor may be configured to: receive the input signal for classification and a set of pre-classified signals. The input signal and each signal in the set of pre-classified signals may include a vector representation of an object having a plurality of vector elements. The processor may be further configured to determine a sparse vector comprising a plurality of sparse vector coefficients. Each sparse vector coefficient corresponding to a signal in the set of pre-classified signals and representing the likelihood of a match between the object represented in the input signal and the object represented in the corresponding signal of the set of pre-classified signals. The processor may be further configured to compare a largest sparse vector coefficient of the determined sparse vector with a predetermined threshold. If the largest sparse vector coefficient is less than the predetermined threshold, the processor may be further configured to: remove the signal of the set of pre-classified signals corresponding to the largest sparse vector coefficient from the set of pre-classified signals to produce a reduced set of pre-classified signals, and repeat the determining and comparing using the input signal and the reduced set of pre-classified signals.

BRIEF DESCRIPTION OF THE SEVERAL VIEWS OF THE DRAWINGS

Example implementations of the present disclosure will be described below with reference to the following drawings, in which.

DETAILED DESCRIPTION

Figure 1:
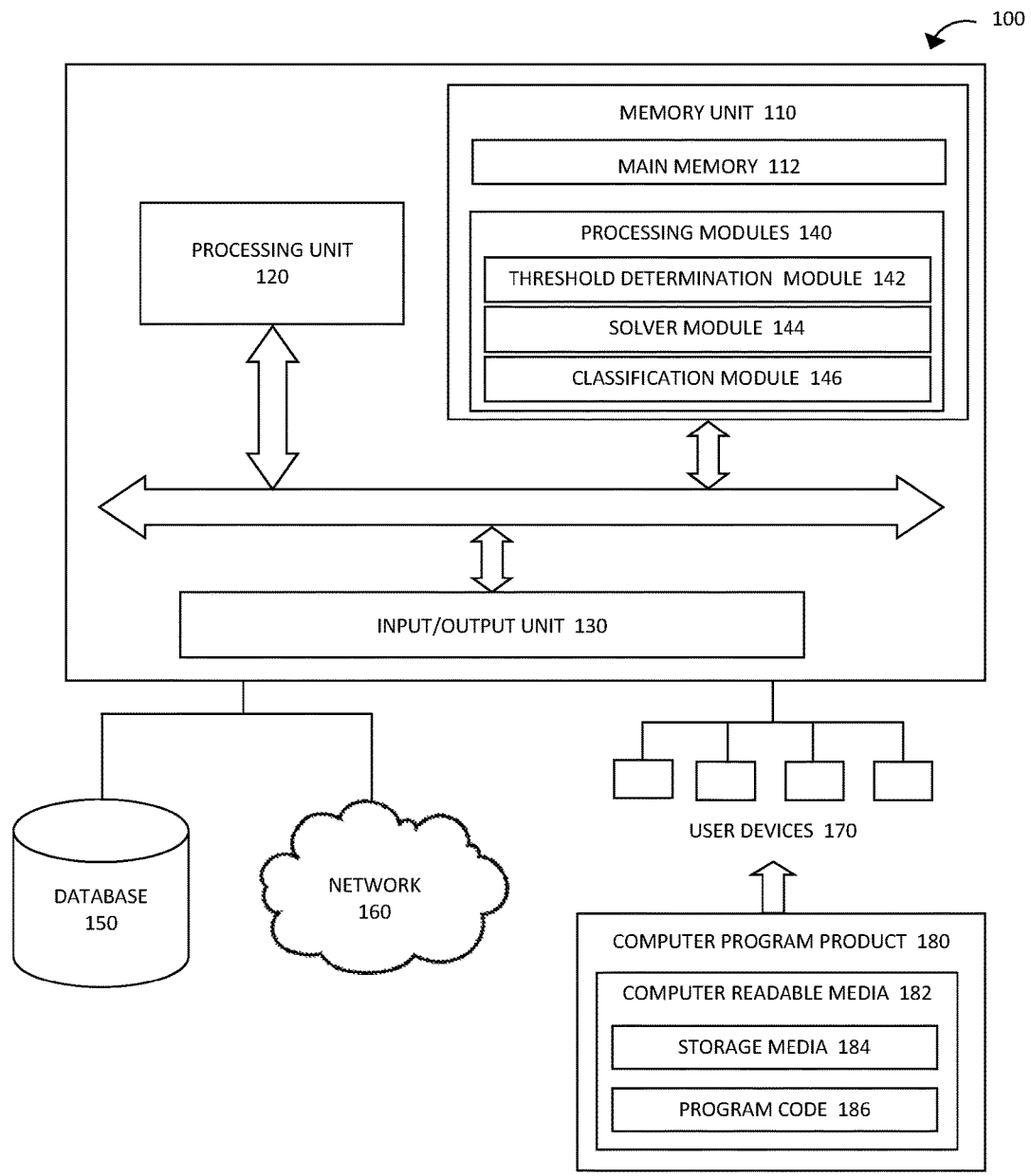
FIG. 1 is a block diagram of a system for signal classification according to example implementations of the present disclosure.

Signal classification techniques may determine whether an input signal (known as a "probe signal") belongs to a particular class of signals that are already known. For instance, a probe signal representing an object may be classified using signals representing pre-classified objects, where the object may be an image, an object or subject of an image or any other entity for classification that may be represented in the signals. In the field of computer vision, signal classification techniques may be used to classify a probe signal containing a high-level representation of an image of a subject, by comparison with a set of pre-classified signals containing high level representations of images of known subjects. In particular, the comparison of the probe signal with the set of pre-classified signals may identify the likelihood of a true-positive match between the images or subjects of the probe signal and one or more of the pre-classified signals. Two types of approach for signal classification may include verification and identification. In facial recognition, for example, verification may involve comparing a probe signal of a facial image of an individual with a signal of a known image in order to verify the identity of the individual (i.e., 1 to 1 matching). In contrast, identification may involve comparing a probe signal of a facial image of an individual with multiple signals of known images in order to determine the identity of the individual (1 to n matching).

Some signal classification techniques use so-called "sparse representation" approaches. Sparse representation solvers use a variety of known algorithms and techniques to solve the equation $A\underline{x}=b$ subject to $\underline{x}$ being as sparse as possible. Such sparse representation solvers may receive a matrix A (e.g., representing a set of images of known subjects) and a vector $\underline{b}$ (e.g., representing a probe image of a subject) as inputs and provide a sparse vector $\underline{x}$ as an output (e.g., whereby each vector element corresponds to the likelihood of a true positive match between the subjects of the probe image and one of the known images represented in the matrix). In the following description, the vector elements of a sparse vector solution $\underline{x}$ are also referred to as "sparse vector coefficients". Generally, the solution to the equation $A\underline{x}=b$ subject to $\underline{x}$ being as sparse as possible is an optimization problem, whereby the equation may be solved numerically to obtain the sparse vector $\underline{x}$, and the largest sparse vector coefficient $x_i$ is used for signal classification. Thus, in the foregoing example, the identity of the subject of the image in the matrix A corresponding to the largest sparse vector coefficient max $x_i$ in the determined sparse vector $\underline{x}$ may be used as the "best match" for the probe image. Accordingly, when applied to facial recognition, sparse representation approaches tend to lead to a single best match, which results in good performance in the case of verification (1 to 1 matching). However, sparse representation approaches may determine an incorrect "best match" (e.g., due to a "red herring" image), which may result in sub-optimal performance in the case of identification (1 to n matching).

Example implementations of the present disclosure include systems, methods and computer program products for use in a signal classification system. Example implementations of the present disclosure relate to a system comprising sub-systems and/or processing modules (e.g., software, firmware and/or hardware) that receive, process and classify signals using a set of corresponding pre-classified signals. The disclosed example implementations may be used for improved signal classification, as described in further detail below. In the drawings, the same or similar features are assigned the same or similar reference numerals.

FIG. 1 illustrates a system 100 for signal classification according to example implementations of the present disclosure. In particular, the illustrated system 100 may be used for signal classification using methods in accordance with example implementations of the present disclosure, as described below.

System 100 includes a memory unit 110 including main memory 112 configured for storing signals and classification data, and processing modules 140 configured for signal processing and/or classification in accordance with example implementations of the present disclosure. System 100 further comprises a processing unit 120 configured for processing signals, for example by executing program code of the processing modules 140. In addition, system 100 comprises an input/output (I/O) unit 130, such as a communication interface, configured for data communication with user devices 170. Such user devices 170 may include user interface devices (such as keyboard, mouse, display, touch screen and touch pad) and/or audio-visual interface devices (such as a camera or microphone) and/or any other suitable device for enabling the user to input data into and/or receive data from system 100. In addition, as shown in FIG. 1, I/O unit 130 may be configured for data communication with a database 150 and, optionally, a data communications network 160. As the skilled person will appreciate, in an alternative standalone system, the database 150 may be internal to system 100 and I/O unit 130 may not be configured to communicate over network 160.

System 100 may receive an input signal for classification from one or more of: main memory 112; user devices 170 and devices connected to network 160. In example implementations, the input signal may comprise a vector representation of an image of a subject, where the vector representation may be derived from the image using any suitable image processing technique. In addition, system 100 may receive a set of pre-classified signals from one or more of: main memory 112; database 150, and user devices 170. The set of pre-classified signals have the same or a similar format to the input signal. Thus, for example, each of the pre-classified signals may comprise a vector representation of an image of a subject, where the vector representation is derived from the image using the same or a similar image processing technique as the vector representation of the input signal.

In accordance with example implementations of the present disclosure, the processing modules 140 in memory unit 110 include a threshold determination module 142 for determining a threshold based on training data in a testing mode, in accordance with example implementations of the present disclosure as described below. In addition, the processing modules 140 further include a solver module 144 for solving an optimization problem using a sparse representation approach for signal classification based on an input signal and a set of pre-classified signals. Solver module 144 may comprise any suitable sparse representation solver, whether known now or developed in the future. Finally, the processing modules 140 include a classification module 146 for iterative signal classification in a classification mode, in accordance with example implementations of the present disclosure as described below.

In example implementations of the present disclosure, a computer program product 180 may be provided, as shown in FIG. 1. The computer program product 180 may include a computer readable media 182 having storage media 184 and program instructions 186 (i.e., program code) embodied therewith. The program instructions 186 may be loaded onto memory unit 110 of system 100 via I/O unit 130, for example by one of user devices 170. The program instructions 186 may comprise any one or more of the above-described processing modules 140, including threshold determination module 142, solver module 144 and classification module 146 of system 100. The program instructions 186 may be executable by the processing unit 120 of system 100 to perform processes for signal processing and/or classification as described below with reference to FIGS. 2 and 3.

Figure 2:
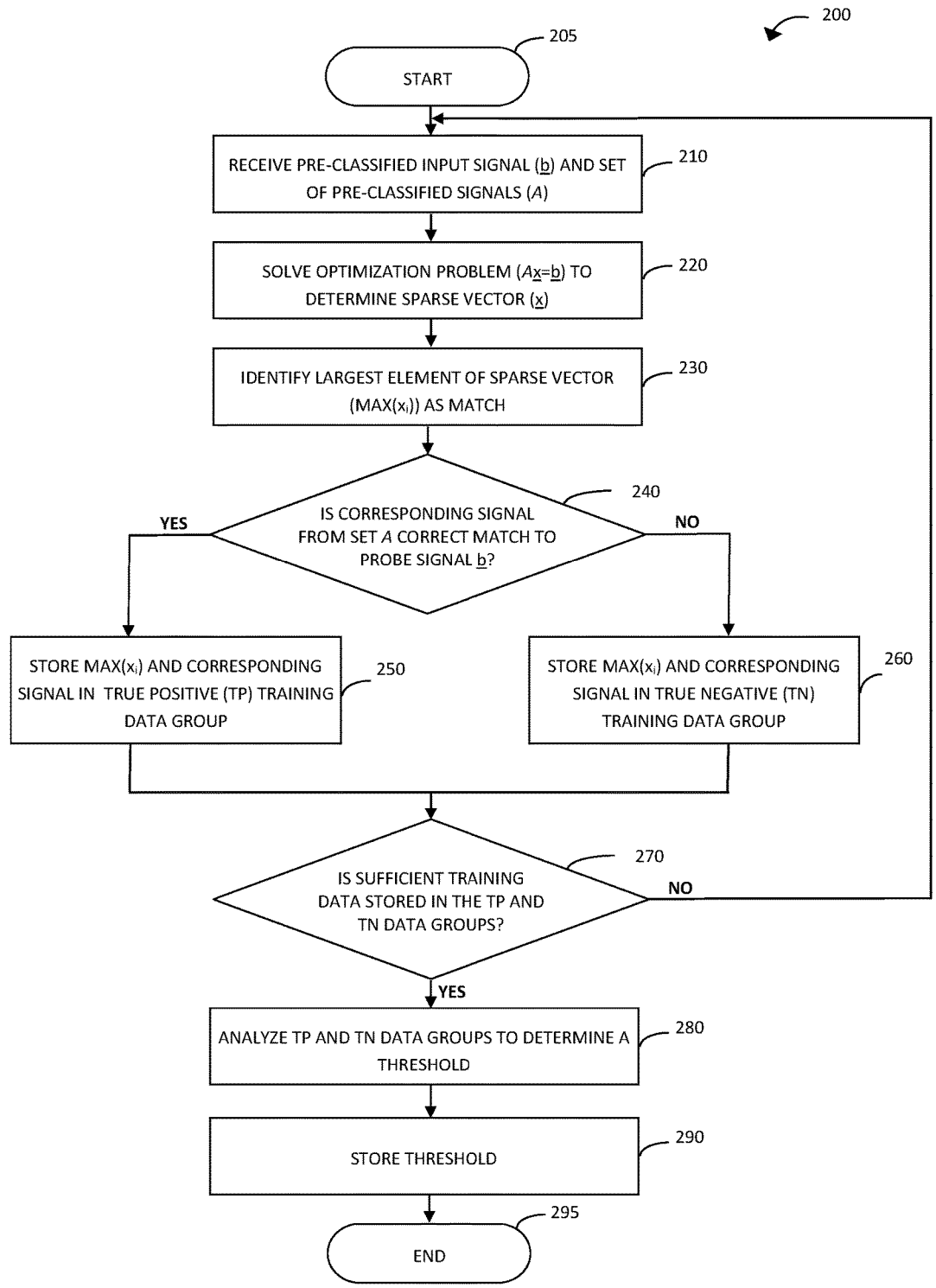
FIG. 2 is a flowchart of a method for determining a threshold for signal classification according to example implementations of the present disclosure.

FIG. 2 is a flowchart illustrating a method 200 for determining a threshold for use in signal classification according to example implementations of the present disclosure. The method 200 may be implemented using the system 100 of FIG. 1, for example using the threshold determination module 142 and/or the solver module 144 of processing modules 140 stored in memory unit 110. The method 200 may be performed in a testing mode of the system 100 or in another system.

The method 200 starts at 205. The method may start in response to a user initiating a process for determining a threshold for use in signal classification or otherwise according to application requirements.

At 210, the method 200 receives an input signal (i.e., probe signal) and a set of pre-classified signals. In an example of signal classification of an input signal representing an image of a subject (e.g., in facial recognition) the probe signal may include a high-level representation of an image of a subject for classification and the set of pre-classified signals may include a plurality of corresponding high level representations of pre-classified images. In accordance with the method 200, the true classification (e.g., true identity of the subject) of the probe signal is known. As the skilled person will appreciate, the probe signal and set of pre-classified signals conform to the same, similar or equivalent format. Thus, for example, the image representations in the probe signal and the set of pre-classified signals may be derived from corresponding subject images using the same or similar image processing techniques. In example implementations of the present disclosure, a database (or subset thereof) of pre-classified image signals may be used, such as Caltech and Georgia Tech databases of classified human facial images.

At 220, the method solves an optimization problem using sparse representation, for example by running a sparse representation solver for solving the equation $A\underline{x}=b$ subject to $\underline{x}$ being as sparse as possible. In example implementations, 220 determines a sparse vector $\underline{x}$ comprising n vector elements $\{x_1, x_2, \ldots, x_n\}$ (i.e., n sparse vector coefficients $x_i$). In particular, sparse vector $\underline{x}$ is determined based on: input vector $\underline{b}$ comprising m vector elements representing the image from the probe signal, an (m×n) matrix A corresponding to a set of n pre-classified vectors $\{\underline{a}_1, \underline{a}_2, \ldots, \underline{a}_n\}$, where each vector $\underline{a}_i$ comprises m vector elements representing an image from the pre-classified signals. Thus, the input vector $\underline{b}$ and each of the pre-classified vectors $\underline{a}_i$ of the matrix have the same or similar format comprising m vector elements. The solver may use any suitable technique for solving the equation $A\underline{x}=b$ subject to $\underline{x}$ being as sparse as possible.

Example sparse representation solvers may use one or more possible algorithms. For example, an algorithm may be based on a greedy strategy approximation, such as the matching pursuit algorithm or the orthogonal matching pursuit algorithm. As another example, the algorithm may be based on a constrained optimization strategy, such as gradient projection sparse reconstruction, the interior-point method, or the alternating direction method. As a further example, the algorithm may be based on proximity optimization techniques, such as through the use of soft thresholding or shrinkage operators, the iterative shrinkage thresholding algorithm (ISTA), fast iterative shrinkage thresholding (FISTA), sparse reconstruction by separable approximation algorithms (SpaRSA), $l_{1/2}$-norm regularization, or augmented Lagrange multiplier based optimization algorithm. As a yet further example, the algorithm may be based on homotopy techniques, such as LASSO homotopy, basis pursuit denoising (BPDN) homotopy or iterative reweighting, $l_1$-norm minimization via homotopy. In example implementations of the present disclosure, the solver may solve the equation $A\underline{x}=b$ subject to $\underline{x}$=argmin ($l_0$-norm of x). It will be appreciated that the above algorithms are merely examples of the types of algorithms that may be used by a sparse representation solver to calculate the sparse vector $\underline{x}$ and that the use of other suitable algorithms, whether known now or developed in the future, are possible and contemplated by the present disclosure.

At 230, the method classifies the probe signal using the sparse vector $\underline{x}$. In particular, 230 identifies the largest sparse vector coefficient max $x_i$ of the sparse vector $\underline{x}$ as indicating a match between the probe signal (i.e., vector $\underline{b}$) and the corresponding pre-classified signal (i.e., vector $\underline{a}_i$) of the pre-classified signal set (i.e., matrix A). As the skilled person will appreciate, the value of each of the n elements of vector $\underline{x}$ represents a likelihood of a true positive match of the vector $\underline{b}$ to the corresponding one of the n pre-classified vectors $\{\underline{a}_1, \underline{a}_2, \ldots, \underline{a}_n\}$ of matrix A. Typically, each sparse vector coefficient $x_i$ comprises a value between 0 and 1, where 0 corresponds to no match (i.e., 0% likelihood of a true positive match or, conversely, 100% likelihood of a true negative match) and 1 corresponds to an exact match (i.e., 100% likelihood of a true positive match). Since the vector $\underline{x}$ is sparse, it mainly comprises sparse vector coefficients $x_i$ with values of 0 and just a few coefficients with values greater than 0. In some sparse representation solvers, only one sparse vector coefficient has a value greater than zero, which would be identified at 230 as the largest sparse vector coefficient max $x_i$ of the sparse vector $\underline{x}$ and therefore indicating a match for classifying the probe signal. In other sparse representation solvers, a few sparse vector coefficients have a value greater than zero, and the sparse vector coefficient with the largest value would be identified at 230 as the largest sparse vector coefficient max $x_i$ of the sparse vector $\underline{x}$ and therefore indicating a match for classifying the probe signal.

At 240, the method determines whether the classification of the probe signal at 230 is correct (i.e., a true positive match). In particular, 240 determines whether the pre-classified signal, corresponding to the matched sparse vector coefficient max $x_i$ of the sparse vector $\underline{x}$ (i.e., the pre-classified signal comprising vector $\underline{a}_i$), is a correct match to the probe signal (i.e., vector $\underline{b}$). As described above, the true or correct classification of the probe signal is known. Accordingly, 240 may compare the classification of the probe signal and the classification of the matched pre-classified signal and determine whether the classifications are the same and therefore a true positive match. Thus, in the example of signal classification of an input signal representing an image of a subject (e.g., in facial recognition), 240 may determine whether the identity of the image represented in the probe signal corresponds to the identity of the image represented in the matched pre-classified signal.

If 240 determines that the matched pre-classified signal is a correct/true positive match to the probe signal (i.e., the classification at 230 is correct), the method proceeds to 250 by storing the value of the matched vector element max $x_i$ of the sparse vector $\underline{x}$ in a true positive training data group in memory. However, if 240 determines that the matched pre-classified signal is an incorrect/true negative match to the probe signal (i.e., the classification at 230 is incorrect), the method proceeds to 260 by storing the value of the matched vector element max $x_i$ of the sparse vector x in a true negative training data group in memory.

Following 250 or 260, the method proceeds to 270. At 270, the method determines whether there is sufficient training data stored in memory in both the true positive and true negative training data groups in order to determine a threshold. Specifically, the required threshold corresponds to a value of a sparse vector coefficient $x_i$ of a sparse vector $\underline{x}$ above which a true positive match is likely and, conversely, below which a true negative match is likely. Typically, a minimum data sample size (i.e., number of sparse vector coefficient values $x_i$ in the true positive/true negative data groups) is required in the training data for a statistically meaningful threshold determination are predefined according to application requirements.

If 270 determines that there is not sufficient training data stored in memory to determine a threshold (e.g., the groups of training data do not satisfy a minimum sample size), the method returns to 210 which receives a new probe signal. The method then continues by iterating in a loop through 210 to 270 to process one or more new probe signals, until there is sufficient training data. If 270 determines that there is sufficient training data stored in memory to determine a threshold (e.g., the groups of training data satisfy a minimum sample size), the method proceeds to 280.

At 280, the method analyzes the true positive and true negative training data groups to determine a threshold. For example, 280 may use Receiver Operating Characteristic (ROC) analysis to determine a good threshold value for max $x_i$. A good threshold value should be such that most (ideally all) sparse vector coefficient values below the threshold correspond to incorrect/true negative matches (e.g., different-identity matches), and most (ideally all) sparse vector coefficient values above the threshold should correspond to correct/true positive matches (e.g., same-identity matches). Thus, a good threshold value will lead to reliable classification results and good performance. In accordance with example implementations of the present disclosure, the representation of the solution vector $\underline{x}$ is sparse, and therefore has a good Receiver Operating Characteristic. Thus, the distributions of values of max $x_i$ stored in the correct training data group and the incorrect training data group are clearly distinct from one another. This enables a good threshold value to be readily determined by comparing the distributions of values of max $x_i$ in the two distinct (true positive and true negative) training data groups. For example, the threshold value may be an average of the highest/average value of max $x_i$ in the incorrect training data group and the lowest/average value of max $x_i$ in the correct training data group. As the skilled person will appreciate, many other techniques for determining the threshold, by analyzing the true positive and true negative training data groups, are possible and contemplated by the present disclosure.

At 290, the method stores the determined threshold value in memory. The method then ends at 295.

Figure 3:
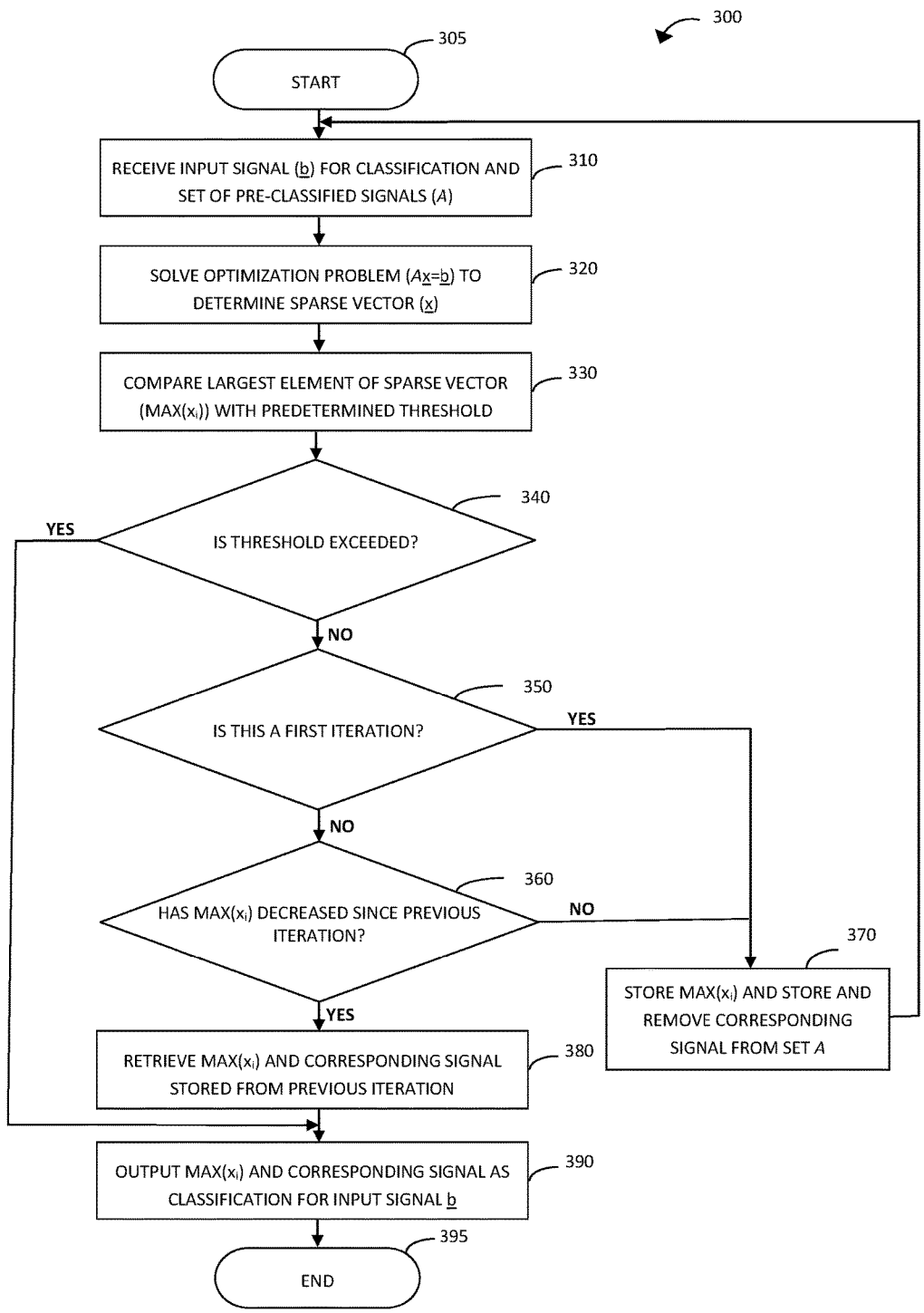
FIG. 3 is a flowchart of a method for signal classification according to example implementations of the present disclosure.

FIG. 3 is a flowchart illustrating a method 300 for signal classification according to example implementations of the present disclosure. The method 300 may be implemented using the system of FIG. 1, for example using the solver module 144 and/or classification module 146 of the processing modules 140 of memory unit 110. In example implementations, the method 300 may be performed in a classification mode using a threshold value determined, for example, in a testing mode using the method 200 of FIG. 2.

The method 300 starts at 305. The method may start in response to a user or another method sending a signal for initiating a process for signal classification or otherwise in accordance with application requirements. For example, the initiating signal may include input or a selection of a signal for classification and/or a selection of a set of pre-classified signals from a database.

At 310, the method receives an input signal (i.e., probe signal) and a set of pre-classified signals. In an example of classifying an input signal representing an image of a subject (e.g., in facial recognition) the probe signal may include a high-level representation of an image of a subject for classification and the set of pre-classified signals may include a plurality of corresponding high-level representations of pre-classified subject images.

At 320, the method solves an optimization problem using sparse representation, for example by running a sparse representation solver for solving the equation $A\underline{x}=\underline{b}$ subject to $\underline{x}$ being as sparse as possible. In example implementations, 320 determines a sparse vector $\underline{x}$ comprising n vector elements $\{x_1, x_2, \ldots, x_n\}$ (i.e., n sparse vector coefficients $x_i$). As described above in relation to 220 of the method 200 of FIG. 2, sparse vector $\underline{x}$ is determined based on: input vector $\underline{b}$ comprising m vector elements representing the image from the probe signal, and (m×n) matrix A corresponding to a set of n pre-classified vectors $\{\underline{a}_1, \underline{a}_n, \ldots, \underline{a}_n\}$, where each vector $\underline{a}_j$ comprises m vector elements representing an image from the pre-classified signals. The sparse representation solver may use any suitable technique for solving the equation $A\underline{x}=\underline{b}$ subject to $\underline{x}$ being as sparse as possible. Examples of suitable sparse representation solvers are set out above. 320 may use the same or a different sparse representation solver to that used at 220 of the method of FIG. 2.

As discussed above, that value of each of them elements of vector $\underline{x}$ (i.e., the value of each sparse vector coefficient $x_i$) represents a likelihood of a true positive match of the vector $\underline{b}$ to the corresponding one of the n pre-classified vectors $\{\underline{a}_1, \underline{a}_n, \ldots, \underline{a}_n\}$ of matrix A. The value of each sparse vector coefficient (i.e., $x_i$) typically comprises a value between 0 and 1, and, since the vector $\underline{x}$ is sparse, it mainly comprises sparse vector coefficients with values of 0 and just a few sparse vector coefficients with values greater than 0.

At 330, the method compares the largest sparse vector coefficient of sparse vector $\underline{x}$ (i.e., max $x_i$) with a predetermined threshold. The predetermined threshold corresponds to a sparse vector coefficient value above which the classification is considered to be reliable (e.g., the individual in the image represented in the probe signal is very likely to be the known individual in the vector $\underline{a}_j$ in the matrix A of pre-classified signals corresponding to max $x_i$). In example implementations, 330 may use a threshold determined in accordance with the method 200 of FIG. 2, which may be adjusted by a user, as required. In other example implementations, other techniques may be used for determining or defining the predetermined threshold.

At 340, the method determines whether the predetermined threshold is exceeded. If the threshold is exceeded, then vector $\underline{a}_j$ in the matrix A corresponding to max $x_i$ is likely to be the best classification match. Thus, if 340 determines that the threshold is exceeded, the method proceeds to 390, which outputs one or more of: the representation vector $\underline{a}_j$; the pre-classified signal including the representation vector $\underline{a}_j$; an image or other entity represented by the vector $\underline{a}_j$ or corresponding pre-classified signal, and the largest sparse vector coefficient of sparse vector $\underline{x}$ (i.e., max $x_i$). However, if 340 determines that the threshold is not exceeded, the method proceeds to 350.

At 350, the method determines whether there has been a previous iteration of 320 to 340. As described below, the method may store data in memory in relation to one or more previous iterations. Thus, for example, 350 may determine whether such data is stored in memory. If 350 determines that there has been a previous iteration, the method proceeds to 360. 360 determines whether the largest sparse vector coefficient value (i.e., max $x_i$) has decreased since the previous iteration. 360 may be performed by comparing the largest sparse vector coefficient (i.e., max $x_i$) in the current iteration with a stored largest sparse vector coefficient (i.e., max $x_i$) from the previous iteration. Details of the storage of vector elements or coefficients of sparse vector $\underline{x}$ from one or more previous iterations are set out below with reference to 360. As the skilled person will appreciate, a decrease in the value of the largest sparse vector coefficient (i.e., max $x_i$) since the previous iteration suggests that the "best match" in the current iteration of the classification method is worse that the "best match" in the previous iteration. Conversely, an increase in the largest sparse vector coefficient value (i.e., max $x_i$) since the previous iteration suggests that the "best match" in the current iteration of the classification method is better that the "best match" in the previous iteration. Thus, 360 effectively determines whether the current iteration of the classification method represents a deterioration in classification performance.

If 350 determines that there has not been a previous iteration (e.g., due to the absence of stored elements of a sparse vector $\underline{x}$ from a previous iteration), or if 360 determines there has been a previous iteration and that the value of the largest element has not decreased since the previous iteration such that classification performance has not deteriorated, the method proceeds to 370.

At 370, the method stores the largest element of sparse vector $\underline{x}$ (i.e., max $x_i$) in memory. The largest sparse vector coefficient stored may include the value and an identifier of the sparse vector coefficient (i.e., $x_i$). In some example implementations, 360 may store the complete sparse vector $\underline{x}$ in memory. In addition, step 360 removes the corresponding pre-classified vector (i.e. vector $\underline{a}_i$) from the matrix A of vectors $\{\underline{a}_1, \underline{a}_2, \ldots, \underline{a}_n\}$ to derive a new matrix A' for use in the next iteration. The method then returns to 310 and at 320 solves the optimization problem using sparse representation with the new matrix A' and vector $\underline{b}$ as inputs, for example using the sparse representation solver for solving the equation A'$\underline{x}$=b subject to $\underline{x}$ being as sparse as possible, and continues with 330 and 340 as the next iteration.

Returning to 360, if it is determined that the value of the largest sparse vector coefficient of sparse vector $\underline{x}$ (i.e., max $x_i$) has decreased since the previous iteration, then classification performance has deteriorated and the method proceeds to 380. At 380, the method retrieves values stored at 370 from the previous iteration, for example the value of the largest sparse vector coefficient of sparse vector $\underline{x}$ (i.e., max $x_i$) and a corresponding identifier (i.e., $x_i$) from the previous iteration. The method then outputs the retrieved values from the previous iteration as the classification result at 380. In particular, as described above, 390 outputs one or more of: the representation vector $\underline{a}_i$; the pre-classified signal including the representation vector $\underline{a}_i$; an image or other entity represented by the vector $\underline{a}_i$ or corresponding pre-classified signal, and the largest sparse vector coefficient of sparse vector $\underline{x}$ (i.e., max $x_i$) from the previous iteration. The method then ends at 395.

In the example implementations described above, the sparse representation solver determines a sparse vector $\underline{x}$ having positive sparse vector coefficients $x_i$. As the skilled person will appreciate, in other example implementations, the sparse representation solver may determine a sparse vector $\underline{x}$ having one or more negative sparse vector coefficients $x_i$, in which case the absolute maximum coefficient value of vector $\underline{x}$ may be identified (i.e., max $|x_i|$) as the largest sparse vector coefficient in the methods of FIGS. 2 and 3 disclosed herein.

As the skilled person will appreciate, 370 of the method 300 of FIG. 3 removes a suspected "false positive" or "red herring" signal from the set of pre-classified signals used for classifying the probe signal. The suspected false positive pre-classified signal is identified on the basis that the value of the corresponding sparse vector coefficient of sparse vector $\underline{x}$ (i.e., max $x_i$) is below the threshold determined, for example, by the method 200 of FIG. 2. In particular, since the value of the largest sparse vector coefficient max $x_i$ is below the threshold, it is likely to represent an incorrect/true negative match. Thus, by removing the suspected false positive signal from the set of pre-classified signals and iteratively re-running the sparse representation solver, using the remainder of the set of pre-classified signals a correct/true positive match may be identified (e.g., max $x_i$ exceeds the threshold at 340) and output at 390. On the other hand, if a subsequent iteration leads to deterioration of the classification performance, the suspected "false positive" signal may be the best classification for the probe signal (whether true positive or true negative) and, in consequence, reinstated at 380 and output at 390.

As the skilled person will appreciate, the above described method 300 of FIG. 3 performs signal classification iteratively using a sparse representation approach, in contrast to conventional signal classification that runs a solver once. Furthermore, the method 300 uses a predetermined threshold to eliminate incorrect/true negative matches due to "red herring" signals in the set of pre-classified signals. This may lead to improved classification performance, as explained in more detail below.

EXAMPLE

The following worked example was carried out by the inventors to illustrate a single result of using the classification method of FIG. 3 (using a threshold determined by the method of FIG. 2) in accordance with the present disclosure for face recognition in a computer vision system.

This example used samples from the Caltech 1999 database of "Faces 1999 (Front)" from http://www.vision.caltech.edu/html-files/archive.html (retrieved 2 Nov. 2016). This database comprised 450 frontal face images of 27 or so unique people, subjects #1-27. Each image provided in a jpeg format file.

i. A sparse representation solver of the equation A$\underline{x}$=b subject to $\underline{x}$ being as sparse as possible, developed by the inventors and implementing the Homotopy method for L1-norm minimization;

ii. A probe signal comprising a vector representation ($\underline{b}$) of image of subject #5 of the Caltech 1999 face database, in particular image_0069.jpg;

iii. A dataset of pre-classified signals (A) comprising vector representations ($\underline{a}_j$) of images of subjects #1 to #27 of the Caltech 1999 face database, and iv. A predetermined threshold of 0.200.

In the first iteration, the sparse representation solver identified a best match for the probe image (image_0069.jpg) to be an image of subject #20 with a vector element value (i.e., sparse representation coefficient) of 0.196.

Note that the first iteration corresponds to the result of a conventional method using the same inputs (ii) and (iii) and solver (i), and would lead to a false "best match" or classification.

Since 0.196 is less than the threshold (i.e., 0.200), the vector representation of the image of subject #20 was removed from the dataset of pre-classified images for use in the second iteration.

In the second iteration, the sparse representation solver identified a best match for the probe image (image_0069.jpg) to be an image of subject #5 with a vector element value (i.e., sparse representation coefficient) of 0.639.

Since 0.639 is greater than the threshold (i.e., 0.200) and represents an increase from the previous iteration, the iterations stopped and the best match for the probe image was output by the method, correctly identifying subject #5.

The foregoing description relates to example implementations of the present disclosure when applied in the field of computer vision, and, in particular, facial recognition. As the skilled person will appreciate, the present disclosure may be applied in other applications in the field of computer vision and relation to in other fields involving signal processing and classification. For example, the disclosure may be used for optical character recognition (OCR) as used, for example, in automatic number plate recognition (ANPR) systems. As another example, the disclosure may be used for other biometric applications, such as tattoo recognition, iris recognition and fingerprint recognition. Thus, in the present disclosure, references to signals including a vector representation of an "object" encompass vector representations of all such objects (including images) that may be classified in accordance with the disclosed signal processing and classification techniques.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described example implementations. The terminology used herein was chosen to best explain the principles of the example implementations, the practical application or technical improvement over technologies found in the marketplace, or to enable others of ordinary skill in the art to understand the example implementations disclosed herein.

What is claimed is:

1. A method, comprising:
    receiving a plurality of input signals for classification and a set of pre-classified signals, wherein each of the plurality of input signals and each signal in the set of pre-classified signals comprises a vector representation of an object having a plurality of vector elements, and wherein the classification of each of the plurality of input signals is known;
    for each input signal:
        determining a sparse vector comprising a plurality of sparse vector coefficients, each sparse vector coefficient corresponding to a signal in the set of pre-classified signals and representing a likelihood of a match between the object represented in the input signal and the object represented in the corresponding signal of the set of pre-classified signals;
        determining whether the object represented in the pre-classified signal corresponding to a largest sparse vector coefficient of the determined sparse vector matches the object represented in the input signal;
        storing a value of the largest sparse vector coefficient in memory, wherein the value of the largest sparse vector coefficient is stored in a first group of training data, if the object represented in the pre-classified signal corresponding thereto matches the object represented in the input signal, and in a second group of training data, if the object represented in the pre-classified signal corresponding thereto does not match the object represented in the input signal;
        determining a threshold value for the largest sparse vector coefficient based on the values stored in the first and second groups of training data in memory, wherein the threshold value represents a minimum value for the largest sparse vector coefficient indicative of a true positive match; and
        comparing the largest sparse vector coefficient of the determined sparse vector with the determined threshold value, wherein, if the largest sparse vector coefficient is less than the determined threshold value, the method further comprises:
            removing the pre-classified signal in the set of pre-classified signals corresponding to the largest sparse vector coefficient from the set of pre-classified signals to produce a reduced set of pre-classified signals; and
            repeating, iteratively, the determining the sparse vector and comparing steps using the input signal and the reduced set of pre-classified signals, wherein each iteration of the input signal further comprises:
                determining whether there has been a previous iteration for the input signal;
                if there has been a previous iteration for the input signal, determining whether the largest sparse vector coefficient in a current iteration is less than the largest sparse vector coefficient in a previous iteration for the input signal; and
                if the largest sparse vector coefficient in the current iteration is less than the largest sparse vector coefficient in a previous iteration, providing a classification output based on the pre-classified signal of the set of pre-classified signals corresponding to the largest sparse vector coefficient in the previous iteration.

2. The method of claim 1, wherein, prior to determining the threshold value, the method comprises:
    determining whether the first and second groups of training data satisfy a minimum sample size for a statistically meaningful determination of the threshold value, and
    if the first and second groups of training data do not satisfy the minimum sample size, repeating the method to obtain further training data using further input signals until the first and second groups of training data satisfy the minimum sample size.

* * * * *